United States Patent [19]

Caines

[11] Patent Number: 4,790,293
[45] Date of Patent: Dec. 13, 1988

[54] APPARATUS AND METHOD FOR SOLAR HEATING OF WATER

[75] Inventor: R. Scott Caines, Greer, S.C.

[73] Assignee: American Hoechst Corporation, Somerville, N.J.

[21] Appl. No.: 578,949

[22] Filed: Feb. 10, 1984

[51] Int. Cl.⁴ .......................... F24J 3/02; E04H 3/18
[52] U.S. Cl. .................... 126/415; 126/426; 126/441; 4/493; 4/496
[58] Field of Search .............. 126/415, 417, 426, 441, 126/449, 445; 4/493, 496, 498, 497, 500, 502, 503, 505

[56] References Cited

U.S. PATENT DOCUMENTS

| | | | |
|---|---|---|---|
| 2,680,437 | 6/1954 | Miller | 126/441 |
| 3,460,166 | 8/1969 | Weber | 4/505 X |
| 4,033,326 | 7/1977 | Leitner | 126/415 |
| 4,262,659 | 4/1981 | Brzezinski | 126/449 |
| 4,284,059 | 8/1981 | Thompson | 126/415 |
| 4,300,530 | 11/1981 | Tetirick | 126/415 |
| 4,402,305 | 9/1983 | Kremen | 126/415 |
| 4,411,031 | 10/1983 | Stolar | 4/502 |

FOREIGN PATENT DOCUMENTS

| | | | |
|---|---|---|---|
| 2453458 | 5/1976 | Fed. Rep. of Germany | 4/502 |
| 994106 | 11/1951 | France | 126/415 |
| 0007041 | 1/1977 | Japan | 126/441 |

Primary Examiner—Margaret A. Focarino
Attorney, Agent, or Firm—Gregory N. Clements

[57] ABSTRACT

A solar heating apparatus for a tank of water is disclosed which comprises a plurality of substantially planar, light absorbent strips positioned substantially vertically in spaced relationship in the water. The plurality of strips functions as a light trap for solar radiation.

38 Claims, 5 Drawing Sheets

APPARATUS AND METHOD FOR SOLAR HEATING OF WATER

BACKGROUND OF THE INVENTION

This invention relates to heating of water by solar radiation. More particularly, the present invention relates to passive solar heating of the water contained in a tank of water by use of substantially planar light absorbent fabric strips positioned substantially vertically in spaced relationship in the water to be heated.

Heating of water by means of electricity or gas is well known and effective, but it has become costly. Passive solar heating of water has been investigated as an alternative and/or supplement to conventional heating methods.

Various solar radiation collector designs have been suggested. Several of these designs seek to maximize absorption of solar radiation by focussing or concentrating sunlight upon a relatively small surface area by means of non-planar reflecting surfaces. T. Hopper, "Solar Energy Collecting Apparatus," U.S. Pat. No. 4,340,034 (July 20, 1982) discloses a plurality of elongated trough-like reflecting surfaces for concentrating solar energy onto a plurality of elongated focal regions through which water to be heated may be pumped. The present invention may be classified as a planar solar energy collecting apparatus and method rather than a concentrating solar energy collecting apparatus and method.

It is believed that the present invention will find its greatest application in the field of swimming pools. The use and enjoyment of recreational outdoor swimming pools can be increased by heating the water to a more comfortable temperature than the ambient temperature. This is especially true in the northern areas of the country where the summer season is relatively short and sufficiently warm days for swimming are limited.

Various designs of swimming pool covers have been proposed ( to maximize heating of water by sunlight and minimize loss of heat by reflection or re-radiation. For example, J. Trihey, "Solar Heating Apparatus For Swimming Pools," U.S. Pat. No. 4,313,421 (Feb. 2, 1982) discloses a flexible, inflatable pool cover comprising two sheets in which air may be forced to provide an insulating layer for insulating the pool during times when the sun is not shining. When the sun is shining, the air may be withdrawn from the cover, thereby allowing a substantial portion of the top sheet to bear against the bottom sheet and providing relatively good thermal conduction from the top sheet, warmed by the sun, to the pool surface. The device includes a hose or conduit having holes along its length to allow circulation of water in the pool to avoid a buildup of a hot layer at the pool surface by connecting said hose or conduit to the water outlet from a conventional pool filter. A plurality of drainage holes are provided in the pool cover to allow rainwater to enter the pool rather than being collected on top of the pool cover. K. Zook, "Flotable Pool Cover," U.S. Pat. No. 4,385,407 (May 31, 1983) claims a generally rectangular flexible sheet having the shape of the pool to be covered with a first substantially rigid floatable means attached to one edge of the cover and a second substantially rigid floatable means attached to the opposite edge of the cover, such that the flexible sheet and the first and second substantially rigid floatable means are adapted to float on the water's surface when a pool is to be covered by the pool cover, and adapted to be wound upon a roll when the pool is to be uncovered.

Solar heating apparatus have been proposed which employ solar heating collection means remote from the pool water itself. R. Garnett, "Solar Energy Collector," U.S. Pat. No. 3,200,820 (Aug. 17, 1965) discloses a non-planar parabolic solar energy collector for heating of swimming pool water. The efficiency of the apparatus is increased by re-reflectance of reflected sunlight back into the solar energy collector. M. Domenach, "Solar Swimming Pool Water Heater," U.S. Pat. No. 4,312,323 (Jan. 26, 1982) discloses a solar heating apparatus comprising an array of adjacent and substantially concentric annular flexible synthetic resin tubes surrounding the pool to be heated, said tubes having a rectified length equal to at least thirty times its horizontal cross-sectional width, having adjacent feed and return ends, a feed manifold connected to all of said feed ends, a return manifold connected to all of said return ends whereby the tubes are connected in parallel between the feed and return manifold. In operation, water from the pool is pumped through the inlet manifold into the tubes, heated by sunlight, and returned to the pool through the outlet manifold. R. Miller, "Solar Collector," U.S. Pat. No. 4,385,624 (May 31, 1983) discloses a solar heating apparatus similar to the apparatus disclosed in U.S. Pat. No. 4,312,323, in which pool water is pumped through at least one spiral hose mounted upon a cone shaped supporting surface whereby the water to be heated is pumped through an inlet which is adjacent the lowermost edge of the supporting surface so that the water is always pumped upwardly to the outlet end of the hose lines adjacent the apex of the cone shaped supporting surface. K. Kohl, "Low Cost, Low Pressure Solar Heated Fence Surrounding A Swimming Pool," U.S. Pat. No. 4,381,763 (May 3, 1983) discloses a remote solar heating apparatus incorporated into a panel fence surrounding the pool to be heated. These designs all have several disadvantages, including electrical energy consumption for pumping the pool water through the apparatus and permanent hardware in the pool area.

An in-pool solar heating apparatus is disclosed in R. Kremen, "Apparatus For Heating A Swimming Pool," U.S. Pat. No. 4,402,305 (Sept. 6, 1983). The heating apparatus comprises at least one reinforced, highly absorptive fabric liner which is ( preferably suspended in the pool water at or near the bottom of the pool in a substantially horizontal position. The fabric liner is preferably constructed of a carbon black ethylene-propylene rubber material, and is designed to be wound upon a storage spool when not in use.

SUMMARY OF THE INVENTION

In one aspect, the present invention is an apparatus for heating of water comprising a plurality of substantially planar light absorbent strips positioned substantially vertically in spaced relationship in said water by means for positioning said strips in said water.

In another aspect, the present invention is a method for heating of water comprising the steps of positioning a plurality of substantially vertical substantially planar light absorbent strips in spaced relationship in said water, and exposing said strips to solar radiation.

DESCRIPTION OF THE INVENTION

As summarized above, one aspect of the present invention is an apparatus for primary or supplementary heating of water comprising a plurality of substantially planar, light absorbent strips positioned substantially vertically in spaced relationship in said water by means for positioning said fabric strips.

By "substantially vertically" it is meant that the longitudinal planes of the light absorbent strips are positioned at an angle with respect to the surface of the earth of at least forty-five (45) degrees.

By "substantially planar" it is meant a substantially optically flat surface in contrast to a concave or convex surface tending to concentrate or diffuse reflected solar energy. This requirement refers to the light absorbent surface itself, and does not limit the geometry of the plurality of strips in any way.

By "in spaced relationship" it is meant any relationship among the substantially planar substantially vertical light absorbent strips which permits reflection and re-reflection of light incident on a light absorbent strip from and to other such strips. The plurality of light absorbent strips thereby serves as a trap for solar radiation which is initially transmitted through the water's surface, is incident upon the surface of a light absorbent strip, but is initially reflected from the surface of the strip rather than absorbed. The overall absorption of solar radiation by the substantially planar light absorbent strips is believed to be increased in this manner.

The means for positioning the substantially planar light absorbent strips in the water to be heated may be suspension means located at or above the water's surface or, alternatively, may be anchoring means located near or at the bottom of the water tank. The selection of positioning means is dependent upon the buoyancy of the light absorbent strips or lack thereof. If the light absorbent strips are not buoyant, or can be made not buoyant, suspension means may be employed in the practice of the present invention. If the light absorbent strips are buoyant, or can be made buoyant, anchoring means may be employed in the practice of the present invention.

The means for suspension of the substantially planar light absorbent strips in the water to be heated may be any support means capable of suspending the strips substantially vertically in the water. The suspension means should suspend the light absorbent fabric strips in such a manner that very little, if any, of the fabric strip is suspended above the water's surface. The overall heating efficiency of the present invention will be decreased if the strips are positioned such that a portion of their light absorbent surface is above the surface of the water to be heated. One of the simplest suspension means is illustrated in FIG. 1.

Figure 1:
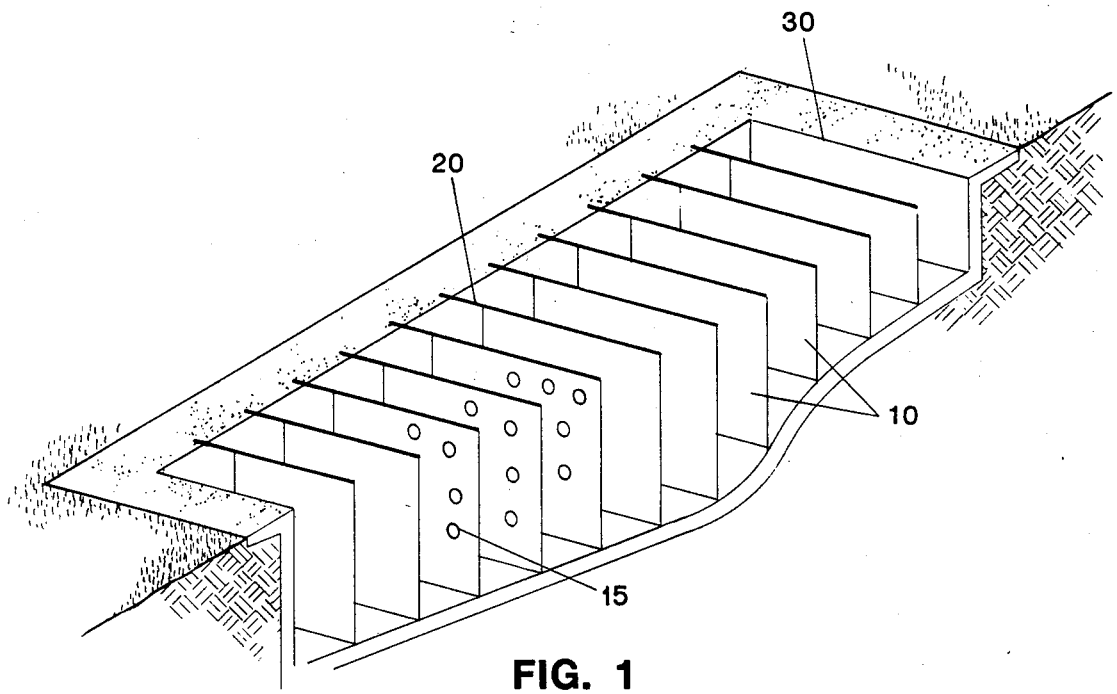
FIG. 1 is a cutaway perspective view of an embodiment of the present invention, depicting substantially vertical, substantially planar, light absorbent strips positioned in spaced linear and parallel relationship in water (not shown) to be heated by solar radiation.
Figure 2:
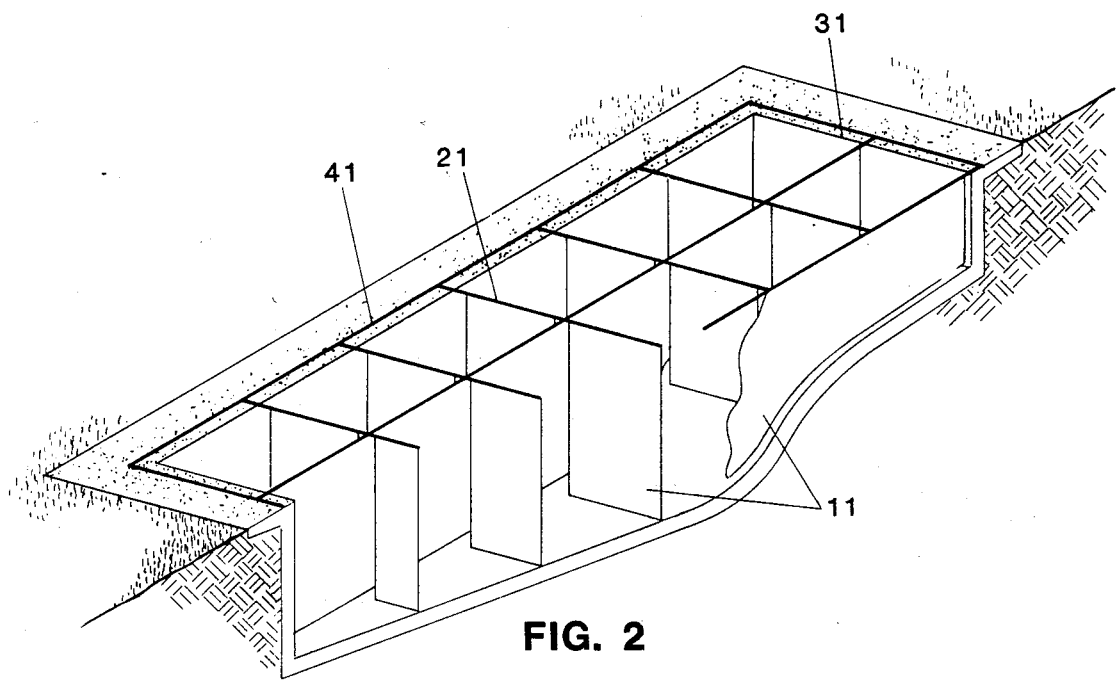
FIG. 2 is an elevated view of an embodiment of the present invention, depicting substantially vertical, substantially planar, light absorbent strips positioned in spaced perpendicular relationship to one another in water (not shown) to be heated by solar radiation.

Referring to FIG. 1, individual substantially planar light absorbent strips 10 are each vertically suspended in water from separate cord-like lines 20, whose ends are fastened under tension to opposing edges of water tank 30. The actual form of the support means is not critical to the present invention, and any departure from the support means depicted in FIG. 1 is permissible and within the scope of the present invention as long as it is capable of vertically suspending a plurality of substantially planar light absorbent strips in the water to be heated without substantially interfering with the exposure of such strips to solar radiation. For example, rather than employing individual points of attachment of lines 20 to the opposing edges of water tank 30, lines 20 may be attached to a single rigid member, shaped in the form of water tank 30, whose perimeter is at least as large as the perimeter of the water tank. Such a rigid member would rest on water tank 20, thereby vertically suspending the strips 10 in the water to be heated and allowing easier removal and installation of the plurality of strips 10. Such a rigid member is illustrated in FIG. 2. Other variations in the design of the substantially vertical, substantially planar strips support means will be readily apparent to those of ordinary skill in the pertinent art.

Substantially planar, light absorbent strips 10 may be attached to support means 20 by a wide variety of conventional techniques. The attachment may be permanent, or the strips may be releasably attached to the support means. Permanent methods of attachment of strips 10 to the support means include, alone or in combination, gluing, stitching, heat sealing, and riveting. Methods for releasable attachment of strips 10 to the support means 20 include hook and grommets, and tying.

Substantially planar, light absorbent strips 10 should be composed of relatively light weight material, and must be capable of withstanding prolonged exposure to ultraviolet radiation without significant degradation. Preferably, the strips should be flexible in order to permit easier storage and handling on those applications where permanent positioning of the strips is not desirable. The strips should be dark colored preferably black, in order to maximize absorption of solar radiation. Polyvinyl chloride sheet and carbon black-filled ethylene-propylene plastic sheet are two specific examples of a suitable absorbent material of the strip 10. Polyvinyl chloride is preferred due to its resistance to degradation by chlorine gas dissolved in pool water.

Substantially planar, light absorbent strips 10 may contain a plurality of small apertures 15 to permit free circulation of water within the water tank. If desired, the absorbent material of the strip may be reinforced by a backing material, which can be sandwiched between two outer layers of light absorbent material. The strips may be weighted at their bottom edge to insure they will hang from their support means in a substantially vertical substantially planar position. This may be readily accomplished by providing pocket-like folds at the base of the strips adapted to receive small lead weights. Alternatively, the fabric strip material should possess a specific gravity greater than one, thereby ensuring that the strips will be properly suspended.

Although FIG. 1 depicts substantially planar, light absorbent strips 10 as substantially as wide as water tank 30 and reaching nearly to the bottom of the tank, it should be understood that the actual dimensions of fabric strips 10 are not critical to the present invention, and any departure therefrom is permissible and within the scope of the present invention as long as the plurality of substantially planar, light absorbent strips 10 can function as a light trap for solar radiation.

Figure 3:
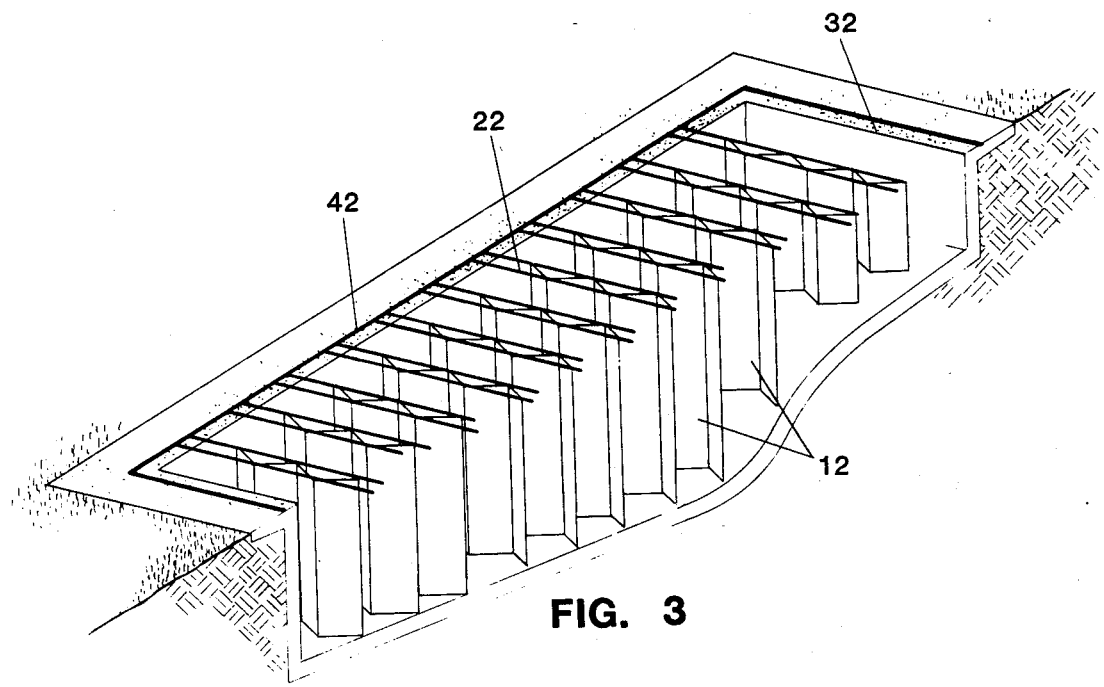
FIG. 3 is an elevated view of an embodiment of the present invention, depicting substantially vertical, substantially planar, light absorbent strips positioned in a spaced zig-zag and parallel relationship to one another in water (not shown) to be heated by solar radiation.
Figure 4:
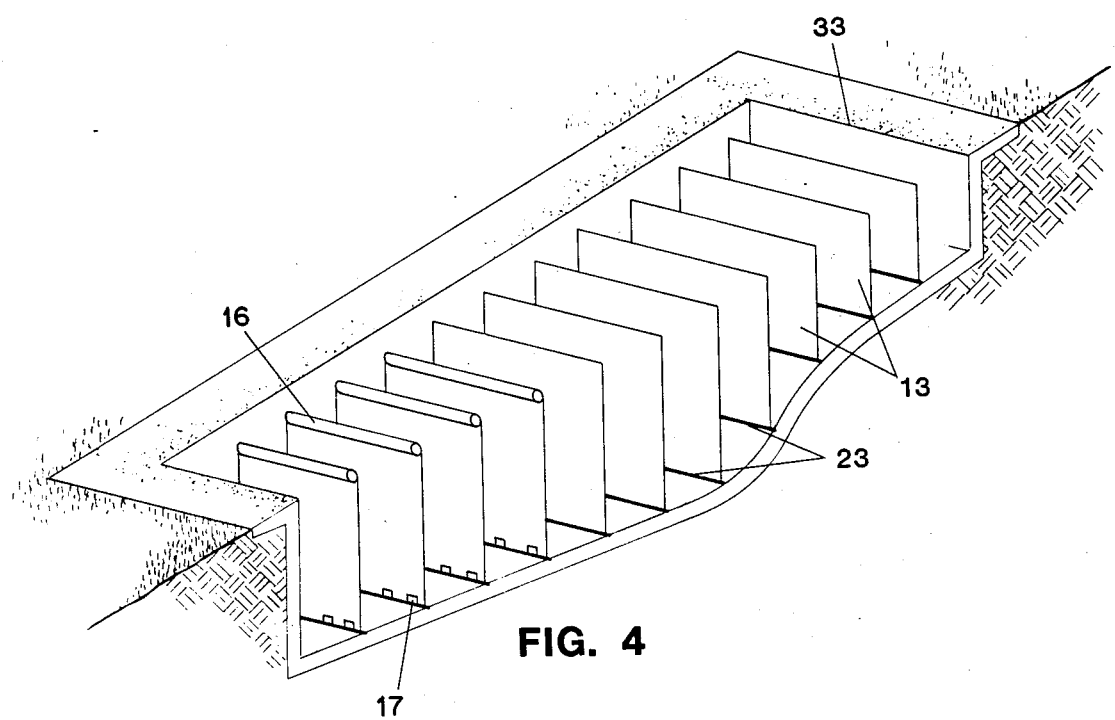
FIG. 4 is a cutaway perspective view of an embodiment of the present invention, depicting substantially vertical, substantially planar, light absorbent strips arranged in spaced linear and parallel relationship buoyantly anchored in water (not shown) to be heated by solar radiation.

Likewise, the spaced relationship of the individual strips may be varied so long as the plurality of strips 10 can function as an optically flat light trap for solar radiation. FIGS. 2, 3 and 4 illustrate various other substantially planar, spaced relationships which may be utilized in order to maximize absorption of solar radiation throughout the daylight hours. Referring to FIG. 2, individual substantially planar, light absorbent strips 11 are each vertically suspended in water from cord-like lines 21, whose ends are fastened under tension to opposing edges of rigid support member 41 which rests on top of water tank 31, such that each individual strip 11 is perpendicular to its adjacent strips, thereby defining a cross-hatched solar radiation trap. Referring to FIG. 3, individual light absorbent strips 12 are each vertically suspended in water from cord-like lines 22, whose ends are fastened under tension to opposing edges of rigid support member 42 which rests on top of water tank 32, such that each light absorbent strip is composed of several relatively narrow, substantially planar ("optically flat"), light absorbent strips which are joined perpendicularly together along their edges to form a "zig-zag" configuration.

Rather than vertically suspending the substantially planar, light absorbent strips in the water to be heated, buoyant strips may be anchored at their lower edges to the bottom of the water tank, such that the buoyant strips maintain a tension upon the means for anchoring said strips, and thereby maintain a substantially vertical substantially planar position in the water to be heated. FIG. 4 depicts an embodiment of the present invention which employs anchored, buoyant, substantially planar light absorbent strips. Referring to FIG. 4, a plurality of buoyant, substantially vertical strips 13 are each anchored to the bottom of water tank 33 by anchoring cord-like lines 23, whose ends are fastened under tension to opposing edges of water tank 33 at or near the bottom of said water tank. The buoyancy of strips 13 may be enhanced by providing flotation devices such as air-filled pockets 16 at or near the top edges of the strips.

The means for anchoring buoyant, substantially planar, light absorbent strips in the water to be heated may be any anchoring means capable of positioning the buoyant strips in a substantially vertical spaced relationship in the water. The actual form of the anchoring means is not critical to the present invention, and any departure from the anchoring means depicted in FIG. 4 is permissible and within the scope of the present invention so long as it is capable of vertically positioning a plurality of buoyant substantially planar, light absorbent strips in the water to be heated without substantially interfering with the exposure of the strips to solar radiation. One of the simplest anchoring means are weights 17, each individually attached to the bottom or lower edge of the buoyant strips, and sufficiently heavy to maintain the buoyant strips in the desired spaced relationship.

Substantially planar, light absorbent strips 13 may be permanently or releasably attached to their anchoring means by the same wide variety of conventional attachment techniques available to attach the non-buoyant light absorbent strips to their suspension means discussed above, including gluing, stitching, heat sealing, riveting, hook and grommet, and tying.

Buoyant, substantially planar, light absorbent strips 13 must be capable of withstanding prolonged exposure to ultraviolet radiation without significant degradation. The buoyant strips should be dark colored, preferably black, in order to maximize absorption of solar radiation. Polyvinyl chloride sheet and carbon-black-filled ethylene propylene sheet are two specific examples of a suitable absorptive material. Polyvinyl chloride is preferred due to its resistance to degradation by chlorine gas dissolved in pool water.

Buoyant, substantially planar, light absorbent strips 13 may contain a plurality of small apertures to permit free circulation of water within the water tank. If desired, the light absorbent material of the buoyant strip 13 may be reinforced by a backing material, which can be sandwiched between two outer layers of absorptive material. Any such backing material should preferably be itself buoyant so as to enhance the overall buoyancy of buoyant strips 13.

Figure 5:
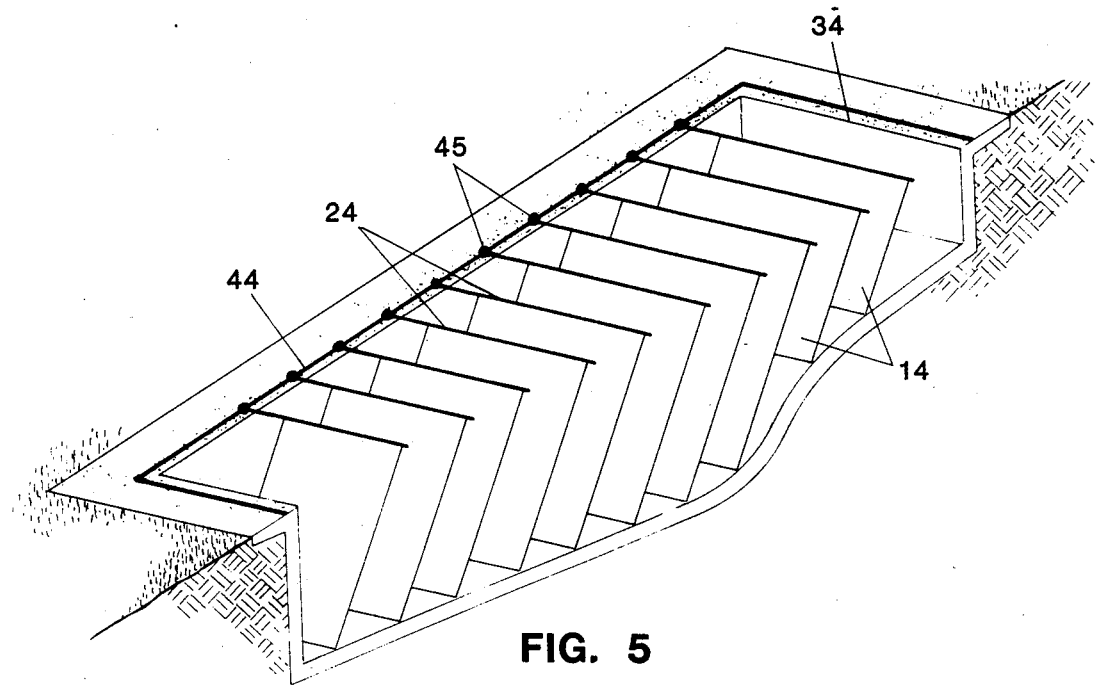
FIG. 5 is a cutaway perspective of an embodiment of the present invention, depicting substantially planar light absorbent strips positioned in spaced linear and parallel relationship in water (not shown) to be heated by solar radiation, with the strips at an angle of approximately forty-five degrees from the earth's surface to optimize absorption of solar radiation.

If the light absorbent strips are rigid, the plurality of strips may be angled from the perpendicular in order to maximize initial absorption of solar radiation and maintain the solar radiation trap function of the plurality of light absorbent strips during midday when the sun is directly overhead. FIG. 5 illustrates an embodiment of the present invention in which each of the rigid strips has been positioned at an angle of approximately forty-five degrees from the earth's surface in order to maximize absorption of solar radiation when the sun is directly overhead. Referring to FIG. 5, rigid light absorbent strips 14 are positioned in water by separate rod-like members 24, whose ends are releasably clamped in position by clamps 45 which are located at opposing edges of rigid support member 44 which rests on top of water tank 34. The angle of the plurality of strips 14 may be varied by loosening clamps 45, rotating rod-like member 24 the desired amount, and tightening clamps 45. Alternatively, rod-like members 24 may be connected to mechanized rotation means, for example an electric motor with appropriate gearing, to permit more convenient and precise control of the angle at which the plurality of light absorbent strips is positioned. This arrangement may be further refined by the addition of a timing apparatus by which the angle of the plurality of substantially planar, light absorbent strips is adjusted periodically throughout the daylight hours to maintain the optimum angle as the sun travels across the sky.

DESCRIPTION OF A PREFERRED EMBODIMENT

While the present invention may have wide and varied utility as a method and apparatus for the heating of water by solar radiation, it is believed that the area of greatest application of the present invention is in the heating of recreational swimming pools.

Figure 6:
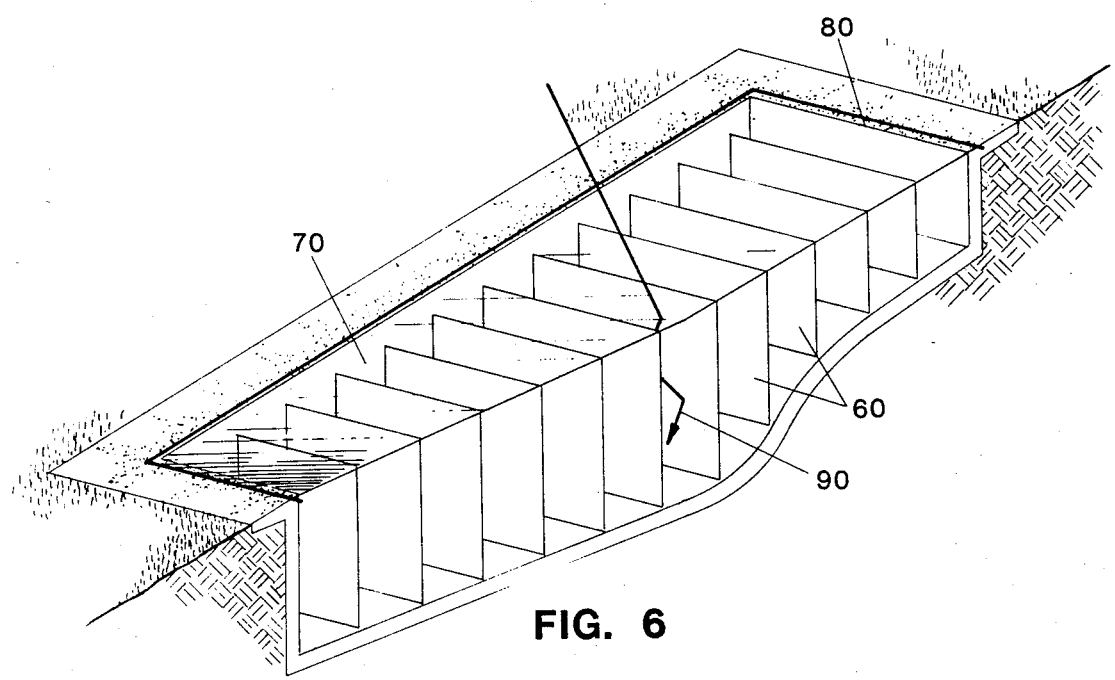
FIG. 6 is a cutaway perspective view of a preferred embodiment of the present invention, depicting a recreational swimming pool to be heated by the apparatus of the present invention, comprising substantially vertical, substantially planar, light absorbent strips suspended in the pool water in spaced linear and parallel relationship from an otherwise conventional, transparent pool cover.

Referring to FIG. 6, individual substantially planar, light absorbent strips 60 are each vertically suspended from transparent pool cover 70 resting on recreational swimming pool 80.

Substantially planar, light absorbent strips 60 each individually act as a separate black body for absorption of solar radiation in a manner similar to the fabric sheet liners disclosed in U.S. Pat. No. 4,402,305. However, the plurality of vertically suspended substantially planar strips of the present invention also and additionally collectively act as a solar radiation trap, which function the fabric liners of U.S. Pat. No. 4,402,305 cannot perform. The plurality of substantially vertically substantially planar strips reflect that portion of solar radiation which is not initially absorbed among the individual light absorbent strips. It is believed that a greater proportion of total solar radiation incident upon the pool surface is absorbed by the light absorbent strips through reflection and re-reflection, finally followed at some point by absorption. While a transparent pool cover 70 and black colored fabric strips 60 will maximize solar radiation absorption within the pool, it is not alleged that the plurality of substantially planar strips will absorb 100% of the solar radiation which initially strikes one of the substantially vertical, substantially planar light absorbent strips.

FIG. 6 illustrates the intended mechanism of the present invention by depicting solar ray 90 being transmitted through pool cover 70, through the surface of the pool water, and striking a portion of the absorbent surface of one of the strips 60. While a portion of the solar ray 90 is absorbed by said strip, another portion of solar ray 90 is reflected from the absorbent surface of strip 60 through the pool water until it strikes the surface of a second, adjacent strip 60. The same process of partial absorption/partial reflectance is repeated until the remaining portion of solar ray 90 is either totally absorbed by a substantially planar, light absorbent strip or escapes the plurality of strips 60.

It should be noted that FIG. 6 illustrates the intended mechanism of the present invention when the sun is relatively low in the sky. If the plurality of substantially planar light absorbent strips are positioned perpendicular to the earth's surface, as shown in FIG. 6, when the sun is directly overhead, virtually no absorption of solar radiation will occur. FIG. 5 depicts a plurality of rigid, substantially planar light absorbent strips positioned to increase the efficiency of the apparatus during the midday hours when the sun is at its highest position in the sky.

Figure 7:
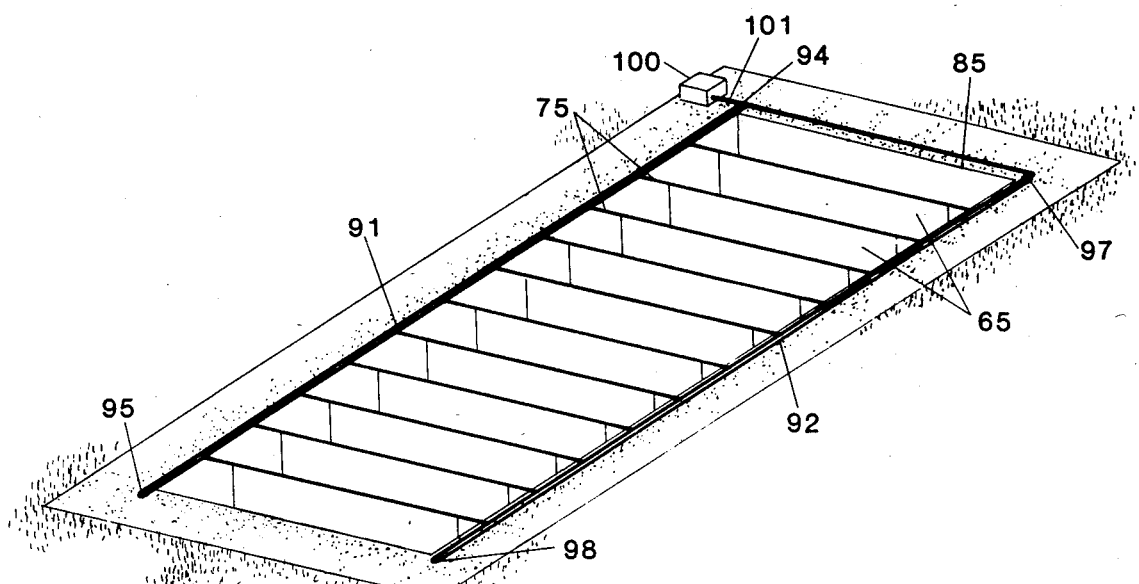
FIG. 7 is an elevated view of a recreational swimming pool equipped with an embodiment of the present invention which depicts an apparatus for the in-pool storage of the present invention.
Figure 8:
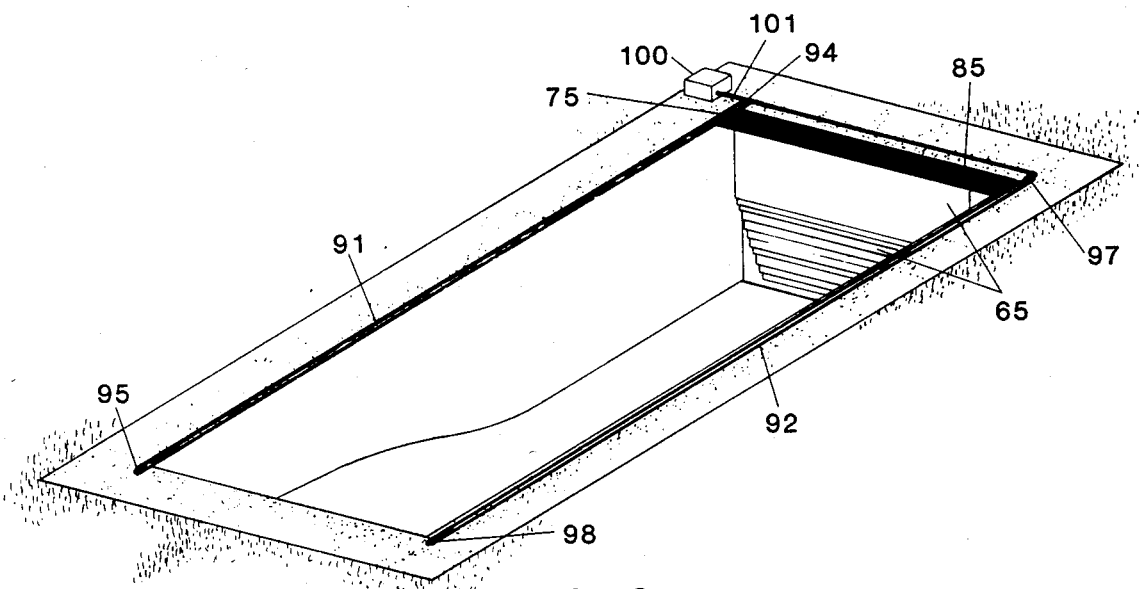
FIG. 8 depicts the recreational swimming pool of FIG. 7 with the present invention in the storage position.

The present invention, when employed to heat a recreational swimming pool, should be easily stored to permit maximum enjoyment of the pool with minimum expenditure of energy. Thus, it is preferable that the light absorbent strips be flexible to permit easy storage and handling. If the strips are attached to a transparent pool cover, removal and storage of the solar heating apparatus of the present invention may be effected by removal and storage of the pool cover. If some other form of strip support is employed, various methods of storage of the solar heating apparatus are available, ranging from sequential manual removal of each substantially planar, light absorbent strip from the swimming pool to mechanical removal and/or storage of the solar heating apparatus. FIGS. 7 and 8 illustrate one embodiment of a mechanized, in-pool storage apparatus and method. Referring to FIG. 7, substantially planar, light absorbent strips 65 are each vertically suspended in water from cord-like lines 75, whose ends are slidably fastened under tension to opposing endless cords 91 and 92 which run parallel to opposing edges of recreational swimming pool 85. Cords 91 and 92 run around pulleys 94 and 95, and 97 and 98 respectively, which are all rotatably mounted to the edges of recreational swimming pool 85. Electric motor 100 rotates pulleys 94 and 97 by means of driveshaft 101. By appropriate operation of electric motor 100, pulleys 94 and 97 may be rotated, thereby causing endless cords 91 and 92 to move, thereby causing substantially planar, light absorbent strips 65 to move to one end of recreational swimming pool 85, and allowing substantially unobstructed use and enjoyment of the pool, as shown in FIG. 8. Substantially planar, light absorbent strips 65 may be redeployed in the pool by simply reversing electric motor 100. Various types of spacers and fasteners may be employed to ensure that strips 65 are in proper spaced relationship when deployed and are stored densely together when the pool is to be used. Such attachment and spacing means are conventional and widely used in curtain rods.

It must be understood that the method and apparatus of in-pool storage of the present invention described above is one of many possible storage methods available to the pool owner. Furthermore, various modifications or variations may be incorporated into such storage devices to minimize or eliminate any esthetic objections without departing from the spirit of the present invention.

Figure 9:
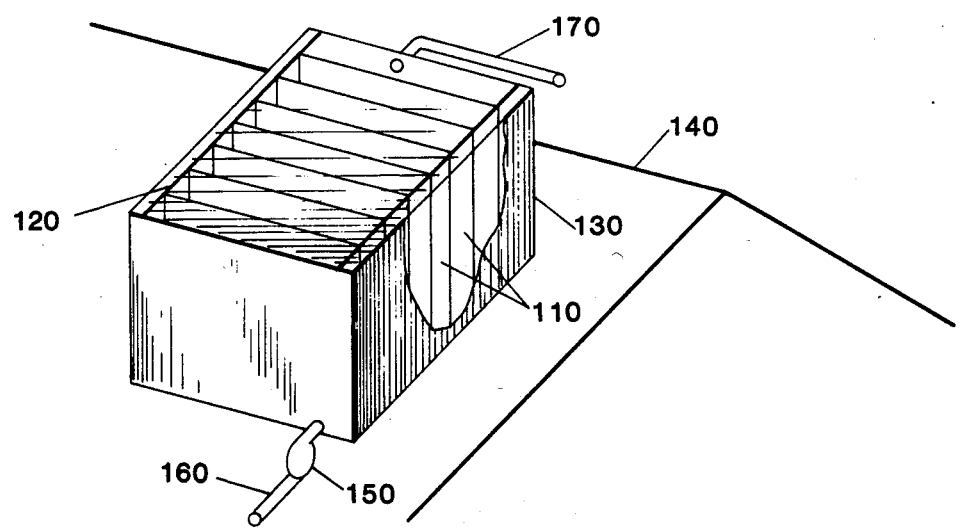
FIG. 9 is a cutaway perspective of an embodiment of the present invention, depicting an apparatus for primary or supplementary heating of water adapted to be used to heat a home, comprising a plurality of substantially vertical, substantially planar, light absorbent strips positioned in spaced linear and parallel relationship in a glass-covered water tank which is mounted on the roof of a home.

While the primary application of the present invention is believed to reside in the solar heating of recreational swimming pools, other applications of the present invention are contemplated by the inventor as well. For example, the present invention may be employed in solar heating systems for structures such as houses. FIG. 9 illustrates one embodiment of the present invention as applied to a solar heating apparatus for primary or supplementary home heating. Referring to FIG. 9, substantially planar light absorbent strips 110 are each vertically suspended in water from separate cord-like lines 120, whose ends are fastened under tension to opposing edges of glass covered reservoir 130 which is mounted on top of roof 140. In operation, water to be heated is pumped from the home heating plumbing (not shown) into the bottom of water reservoir 130 via pump 150 and intake pipe 160. The water is heated by contact with the plurality of light absorbent strips 110 as it rises through the reservoir and finally exits the water reservoir via return pipe 170.

EXAMPLE

The following Example further illustrates the practice and advantage of the present invention. As an example it is illustrative only and specifically not intended to limit the scope of the invention in any way.

EXAMPLE 1

Three rectangular tanks made of translucent plastic, each having dimensions of 12 inches high, 12 inches wide, and 12 inches deep were placed outside in full view of the sun, and filled with water. One of the tanks was left uncovered as a control. The second tank was covered with a clear, plasticized polyvinyl chloride cover comprising two layers such that it formed an insulating, floatable, transparent blanket. The third tank was similarly covered with a transparent polyvinyl chloride cover, but five substantially planar, light absorbent black polyvinyl chloride strips were also substantially vertically suspended in the tank from the underside of the clear tank cover.

The black polyvinyl chloride strips were permanently attached to the transparent cover by heat sealing. The strips were about 11.0 inches wide, about 9.0 inches long, and spaced about 3 inches from one another in the tank, and substantially parallel to one another.

The tank containing the five suspended black strips was positioned such that the plane of the strips was perpendicular to the direction of incident sunlight. The water temperature of all three tanks and the ambient air temperature was measured every hour with the same thermometer. Each tank was thoroughly stirred to assure a uniform temperature, and the temperature measurements were taken in the approximate center of each tank. The temperature measurements are set out in TABLE I below:

TABLE I

| Time | Ambient Temperature °C. | Water Temperature of Tank | | |
|---|---|---|---|---|
| | | Control | Cover Only | Cover Plus Strips |
| 8 am | 5.2 | 3.7 | 4.9 | 5.2 |
| 9 am | 8.1 | 5.3 | 6.2 | 6.8 |
| 10 am | 12.1 | 7.3 | 8.0 | 8.8 |
| 11 am | 14.3 | 9.9 | 10.5 | 11.5 |
| 12 Noon | 16.7 | 12.7 | 13.2 | 14.7 |
| 1 pm | reading not taken | 15.5 | 16.2 | 18.1 |
| 2 pm | 22.3 | 18.1 | 19.0 | 21.2 |
| 3 pm | 21.5 | 19.6 | 21.2 | 23.0 |
| 4 pm | 23.4 | 20.5 | 22.8 | 24.0 |

I claim:

1. An apparatus for heating a tank of water comprising at least three substantially planar plastic strips positioned substantially vertically in spaced relationship in said water, such that said strips are substantially immersed in the water to be heated, and means for positioning said strips in said water with the provisos (1) that said strips are light absorbent on both major planar surfaces and (2) that said positioning means is of such construction as to minimize absorption of solar radiation by the positioning means rather than by said strips.

2. The apparatus of claim 1 wherein said strips are in spaced linear and parallel relationship.

3. The apparatus of claim 1 wherein said strips are in spaced perpendicular relationship.

4. The apparatus of claim 1 wherein said strips are in spaced zig-zag and parallel relationship.

5. The apparatus of claim 1 wherein said strips contain a plurality of apertures to permit free circulation of water.

6. The apparatus of claim 1 wherein said positioning means is a means for suspending said strips substantially vertically in said water.

7. The apparatus of claim 6 wherein said strips are weighted to insure that said strips hang suspended in a substantially vertical position from said suspension means.

8. The apparatus of claim 6 wherein said strips are made of material having a specific gravity greater than one to insure that said strips hang suspended in a substantially vertical position from said suspension means.

9. The apparatus of claim 6 wherein said means for suspension of said strips comprises a plurality of flexible cord-like lines, such that each strip is suspended from at least one cord-like line, and the ends of each line are fastened under tension to opposing sides of said tank.

10. The apparatus of claim 9 wherein said means for suspension of said strip comprises a plurality of flexible cord-like lines, and a rigid support member whose shape approximates the shape of the tank of water to be heated and whose perimeter is at least as large as said pool perimeter, such that the ends of said lines are attached under tension to opposing sides of said rigid support member.

11. The apparatus of claim 6 wherein said means for suspension of said strips comprises a transparent tank cover.

12. The apparatus of claim 1 wherein said positioning means is a means for buoyantly anchoring said strips substantially vertically in said water.

13. The apparatus of claim 12 wherein said strips are made of a polymeric material having a specific gravity less than one to insure that said strips are buoyantly anchored to said anchoring means.

14. The apparatus of claim 12 wherein said strips possess a means for buoyancy attached to the end of said strips opposite the ends attached to said anchoring means.

15. The apparatus of claim 12 wherein said anchoring means is a plurality of weights, such that at least one weight is attached to one end of each of said strips, with the proviso that said anchoring means is sufficiently heavy to maintain said strips in the desired spaced relationship.

16. The apparatus of claim 12 wherein said anchoring means comprises a plurality of cord-like lines submerged at or near the bottom of the tank, whose ends are fastened under tension to opposing edges of said tank, and which are attached to the lower edges of one or more of said strips.

17. The apparatus of claim 1 wherein said strips are rigid, and further including means to position said plurality of said strips from 45° to 90° to the earth's surface.

18. The apparatus of claim 1 wherein said tank of water is a recreational swimming pool.

19. A method for solar heating of a tank of water comprising the steps of positioning at least three substantially vertical, substantially planar plastic strips in spaced relationship in said water, such that said strips are substantially immersed in the water to be heated, with the proviso that said strips are light absorbent on both major planar surfaces, and exposing said strips to solar radiation.

20. The method of claim 19 wherein said strips are in spaced linear and parallel relationship.

21. The method of claim 19 wherein said strips are in spaced perpendicular relationship.

22. The method of claim 19 wherein said strips are in spaced zig-zag and parallel relationship.

23. The method of claim 19 wherein said strips contain a plurality of apertures to permit free circulation of water.

24. The method of claim 19 wherein said strips are positioned in substantially vertical spaced relationship by suspending said strips from means for suspension of said strips.

25. The method of claim 24 wherein said strips are weighted to insure that said strips hang suspended in a substantially vertical position from said suspension means.

26. The method of claim 24 wherein said strips are made of a polymeric material having a specific gravity greater than one to insure that said strips hang suspended in a substantially vertical position from said suspension means.

27. The method of claim 24 wherein the substantially vertical suspension of at least three substantially planar light absorbent plastic strips in said tank is effected by attaching the top edges of said strips to at least one of said cord-like lines, with the ends of said lines fastened under tension to opposing edges of said tank, such that said strips are suspended in a substantially vertical spaced relationship in said water.

28. The method of claim 24 wherein the substantially vertical suspension of at least three substantially planar strips in said tank is effected by attaching the top edge of each plastic strip to separate cord-like lines, with the ends of each of said lines fastened under tension to opposing edges of a rigid support member whose shape approximates said tank and whose perimeter is at least as large as the perimeter of said tank such that the plastic strips are suspended in a substantially vertical spaced relationship in said water.

29. The method of claim 24 wherein the substantially vertical suspension of light absorbent strips in said tank is effected by attaching the top edge of each strip to the underside of a transparent cover such that said strips are suspended in a substantially vertical spaced relationship in said water.

30. The method of claim 19 wherein said strips are positioned in substantially vertical spaced relationship by buoyantly anchoring said strips in said water.

31. The method of claim 30 wherein said strips are made of a material having a specific gravity less than one to insure that said strips are buoyantly anchored to an anchor.

32. The method of claim 30 wherein said strips possess a means for buoyancy attached to the ends of said strips opposite the ends attached to an anchor.

33. The method of claim 30 wherein said strips are buoyantly attached to a weight at one end, which is sufficiently heavy to maintain said strips in the desired spaced relationship.

34. The method of claim 30 wherein said strips are buoyantly attached to a plurality of cord-like lines submerged at or near the bottom of said tank, whose ends are fastened under tension to opposing edges of said tank.

35. The method of claim 19 wherein said tank of water is a recreational swimming pool.

36. A recreational swimming pool equipped with a solar heating apparatus comprising at least three substantially planar plastic strips removably positioned substantially vertically in spaced relationship in the pool water, such that and means for removably positioning said strips in spaced relationship in said pool water with the proviso that said strips are light absorbent on both major planar surfaces.

37. The recreational swimming pool of claim 36 wherein said means for removably positioning said strips in said pool comprises mechanized means for in-pool storage and re-positioning of said strips.

38. Apparatus for heating a recreational swimming pool comprising (i) a solar radiation trap consisting of at least three substantially vertical, substantially planar plastic strips in spaced relationship to one another, such that said strips are substantially immersed in the water to be heated, with the proviso that said strips must be light absorbent on both major planar surfaces and (ii) means for removably positioning said solar radiation trap in said pool with the proviso that said positioning means be or such construction so as to minimize absorption of solar radiation by the positioning means rather than by said strips.

* * * * *